C. F. MILHOLEN.
ASH PAN.
APPLICATION FILED NOV. 10, 1920.
1,423,352.
Patented July 18, 1922.
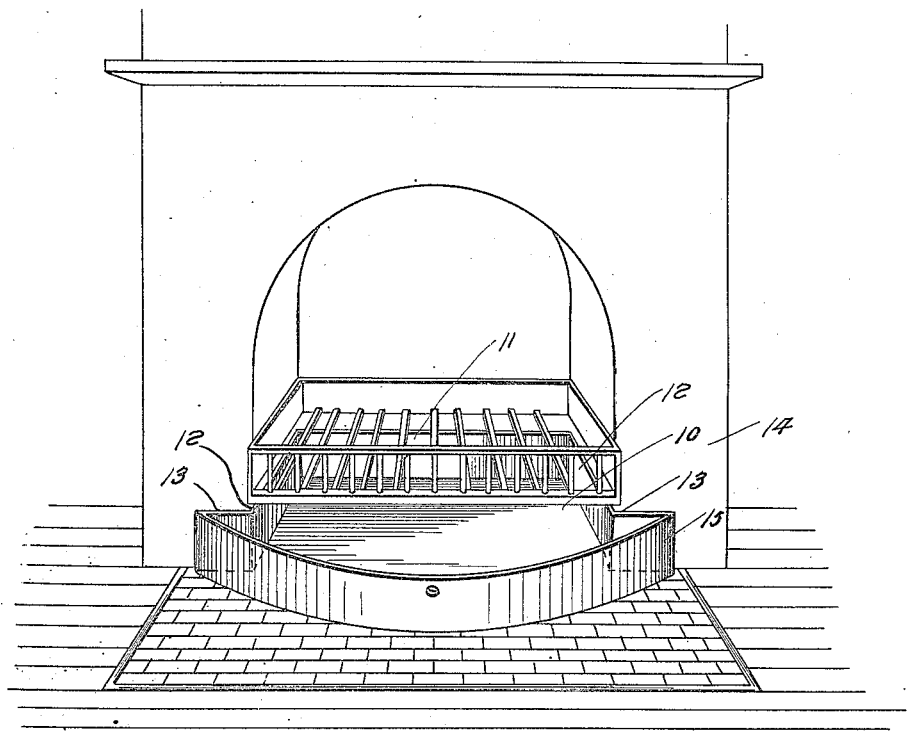
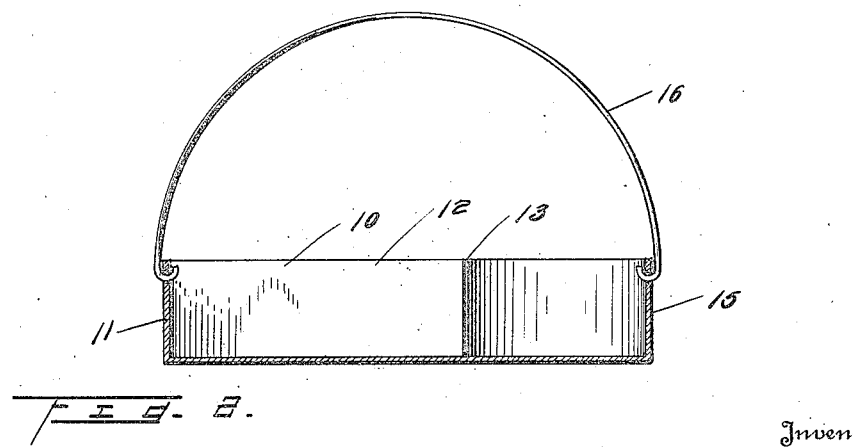
Inventor
C. F. Milholen.

UNITED STATES PATENT OFFICE.

CHARLES F. MILHOLEN, OF KANNAPOLIS, NORTH CAROLINA.

ASH PAN.

1,423,352.  Specification of Letters Patent.  Patented July 18, 1922.

Application filed November 10, 1920. Serial No. 423,080.

*To all whom it may concern:*

Be it known that I, CHARLES F. MILHOLEN, a citizen of the United States, residing at Kannapolis, in the county of Cabarrus and State of North Carolina, have invented certain new and useful Improvements in Ash Pans; and I do hereby declare the following to be a full, clear, and exact description of the invention, such as will enable others skilled in the art to which it appertains to make and use the same.

The object of the invention is to provide a simple, inexpensive and efficient device adapted particularly for use as an ash receiver in connection with open fire-places as a means of catching and permitting of the expeditious removal of the ashes without necessitating the shoveling of the same and without involving the disadvantages of scattering the ashes and producing an objectionable dust in the course of the removal thereof from the fire-place; and with these objects in view the invention consists in a device of which a preferred form is illustrated in the accompanying drawings, wherein:

Fig. 1 is a view of the ash pan arranged in the operative position in a fire-place, Fig. 2 is a view of the pan detached or removed from the fire-place.

The body portion 10 of the pan is substantially rectangular in form having the rear and side walls 11 and 12 at the front ends of the latter of which are arranged offsets 13 forming shoulders adapted to bear against the jambs of the fire-place 14 and the front end of the pan is transversely extended as shown and is provided with a front arcuate guard flange 15 extending outward beyond the plane of the front of the grate 16 so as to catch ashes and sparks dropping from the front of the grate to prevent the same from reaching the floor or tiling at the front of the fire-place. The offsets or shoulders 13 limit the extent of the insertion of the pan so as to maintain the enlargement at the front end of the pan in projecting relation with the front of the grate and said enlargement further furnishes a convenient means whereby the pan may be inserted and removed from the ash pit beneath the grate, while for carrying the pan in the transportation of the ashes to a point of deposit or discharge, a bail or handle 16 is employed, the extremities thereof being engaged respectively with the rear wall 11 and the front arcuate wall 15 at or about the centers thereof.

Having thus described the invention what I claim is:

An ash pan for fireplaces having a body portion for disposition below a grate, lateral offsets on and extending a considerable distance from said portion for contact with the jambs of the fireplace to limit insertion of the pan, a front wall extending from the outer extremity of one of said offsets to the other offset, said front wall being deflected forwardly and the pan being unobstructed above its bottom forwardly of a line passing through said offsets so as to catch and retain ashes and sparks falling off the grate beyond the front margin thereof.

In testimony whereof I affix my signature in presence of two witnesses.

CHARLES F. MILHOLEN.

Witnesses:
M. E. JOHNSON,
C. B. PONTIS.